(12) United States Patent
Liu (10) Patent No.: US 9,565,463 B2
(45) Date of Patent: Feb. 7, 2017

(54) METHOD FOR DISTANCE BASED CONTENT MIRRORING AND MIRRORING TRANSFER

(71) Applicant: Xudong Liu, San Jose, CA (US)

(72) Inventor: Xudong Liu, San Jose, CA (US)

( * ) Notice: Subject to any disclaimer, the term of this patent is extended or adjusted under 35 U.S.C. 154(b) by 0 days.

(21) Appl. No.: 15/054,119

(22) Filed: Feb. 25, 2016

(65) Prior Publication Data

US 2016/0249087 A1 Aug. 25, 2016

Related U.S. Application Data

(60) Provisional application No. 62/120,494, filed on Feb. 25, 2015.

(51) Int. Cl.
| | |
|---|---|
| *H04N 7/16* | (2011.01) |
| *H04N 21/41* | (2011.01) |
| *H04N 21/45* | (2011.01) |
| *H04N 21/4223* | (2011.01) |
| *H04N 21/439* | (2011.01) |
| *H04N 21/258* | (2011.01) |
| *H04N 21/414* | (2011.01) |
| *H04N 21/436* | (2011.01) |
| *H04N 21/4363* | (2011.01) |

(52) U.S. Cl.
CPC .... *H04N 21/4122* (2013.01); *H04N 21/25816* (2013.01); *H04N 21/41407* (2013.01); *H04N 21/4223* (2013.01); *H04N 21/439* (2013.01); *H04N 21/43615* (2013.01); *H04N 21/43637* (2013.01); *H04N 21/4524* (2013.01)

(58) Field of Classification Search
CPC ............ H04N 21/4122; H04N 21/4524; H04N 21/4223; H04N 21/439; H04N 21/25816; H04N 21/41407; H04N 21/43615; H04N 21/43657
See application file for complete search history.

(56) References Cited

U.S. PATENT DOCUMENTS

| | | | | |
|---|---|---|---|---|
| 8,549,557 B2* | 10/2013 | Pan | ..................... | H04N 21/2668 725/10 |
| 8,640,175 B2* | 1/2014 | Ko | ....................... | H04N 5/4403 345/156 |
| 2006/0258289 A1* | 11/2006 | Dua | .................. | G06F 17/30058 455/41.3 |
| 2007/0061725 A1* | 3/2007 | Isaac | .................. | H04N 7/17318 715/717 |
| 2009/0228919 A1* | 9/2009 | Zott | .................... | H04N 7/17318 725/34 |

(Continued)

*Primary Examiner* — Oschta Montoya (57) ABSTRACT

A method of mirroring primary media content from a portable computing device to a network of audiovisual (AV) units and handing over the mirroring among the network of AV units is provided with a predetermined value index and an operational visual range for the network of AV units. The signal strength between the portable computing device and an arbitrary unit of the network of AV units and the geospatial location of the portable computing device is measured when calculating a value index. The value index and the predetermined value index are used in generating a client identification (ID) for the portable computing device. The client ID is used to minor the primary media content on the arbitrary unit. Moreover, the client ID is also used to handover mirroring among the network of AV units.

7 Claims, 8 Drawing Sheets

(56) References Cited

U.S. PATENT DOCUMENTS

| | | | |
|---|---|---|---|
| 2011/0054641 A1* | 3/2011 | Hur | G08C 17/00 700/20 |
| 2012/0040720 A1* | 2/2012 | Zhang | H04M 1/7253 455/557 |
| 2012/0192071 A1* | 7/2012 | Millington | H04J 3/0664 715/716 |
| 2012/0272062 A1* | 10/2012 | Lee | G08C 17/02 713/170 |
| 2012/0304233 A1* | 11/2012 | Roberts | H04N 21/23113 725/82 |
| 2013/0073584 A1* | 3/2013 | Kuper | G06F 17/30761 707/769 |

* cited by examiner

METHOD FOR DISTANCE BASED CONTENT MIRRORING AND MIRRORING TRANSFER

The current application claims a priority to the U.S. Provisional Patent application Ser. No. 62/120,494 filed on Feb. 25, 2015.

FIELD OF THE INVENTION

The present invention relates generally to a method of mirroring video content. More specifically, the present invention is a method which can be used to mirror video content from a mobile phone onto a display screen. Additionally, the present invention also introduces a method to handover mirroring from one display screen to another so that the user is not limited to the range of one display screen.

BACKGROUND OF THE INVENTION

Traditionally, data transfer cables were used to transfer content from a mobile phone to a display screen. In doing so, one end is attached to the mobile phone and the opposite end is attached to the display screen. Since, the cable needs to always be present during the content transfer process, the use of the mobile phone and also the mobility of the individual using the mobile phone is limited. In order to address the issue of limited mobility, wireless transfer methods were introduced.

Even though wireless transfer methods are more advantageous compared to transferring media content through the cable, these wireless transfer methods also have certain disadvantages. Being limited to a single display screen is one of the main disadvantages with the existing wireless transfer methods. Therefore, even though the user has more mobility than when a cable is used, the user is limited to a certain extent. More specifically, the user is limited to the wireless range supported by the mobile phone and the connected display screen. If the user needs to be mobile during the content mirroring on the display screen, the limited range can be disadvantageous.

Restrictions in the number of devices that can be used is another disadvantage with the existing screen mirroring technology. More specifically, with the existing technology, the mirroring technology can be used only with display screens that are compatible with wireless media transfer methods such as Bluetooth and Wi-Fi. The need to have similar compatibilities on both the mobile phone and the display screen can be stressful at times.

The objective of the present invention is to address the aforementioned issues. In particular, the present invention introduces a method that can be used for mirroring content from a mobile phone to a digital screen. Moreover, the present invention also allows the user to sequentially utilize multiple screens for mirroring purposes such that the mobility of the user or the mirroring of the media content is not hindered. The display screens used in the present invention are uniquely designed such that the mobile phone can conveniently establish a connection with any of the display screens in correspondence with the location of the user. Additionally, the display screens are not limited to a television or other comparable display screens. When the screens are not used for mirroring content from the mobile phone, other content such as pictures associated with the user can be displayed on each of the display screens.

DETAIL DESCRIPTIONS OF THE INVENTION

All illustrations of the drawings are for the purpose of describing selected versions of the present invention and are not intended to limit the scope of the present invention.

The present invention introduces a method that can be used to mirror media content from a mobile device onto a display screen. By doing so, a user can view the media content on a larger screen improving convenience. Moreover, the present invention introduces a method for handing over the mirroring from one display screen to another display screen so that the mobility of the user is not restricted to one display screen.

Figure 1:
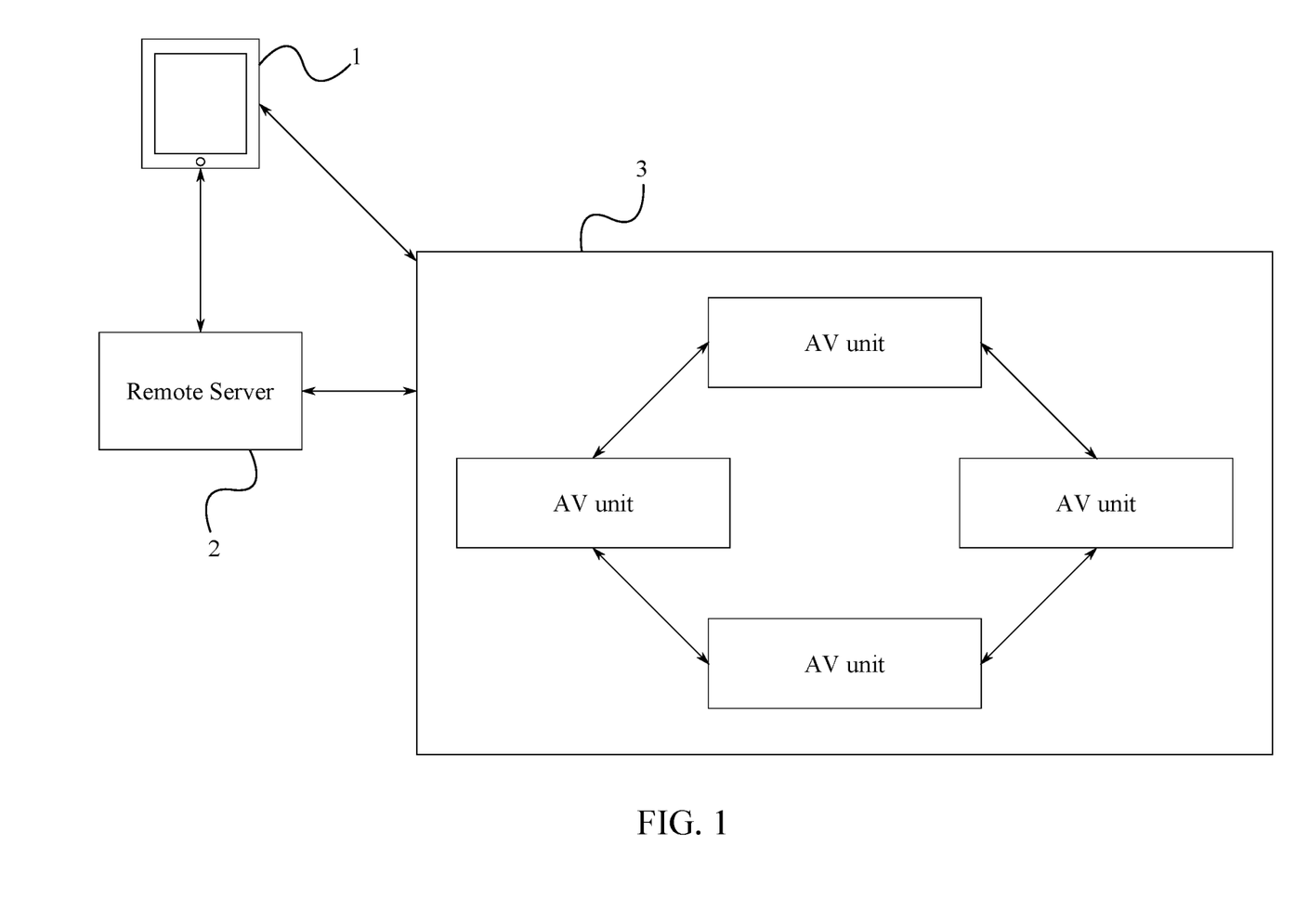
FIG. 1 is an illustration of the system overview of the present invention.
Figure 2:
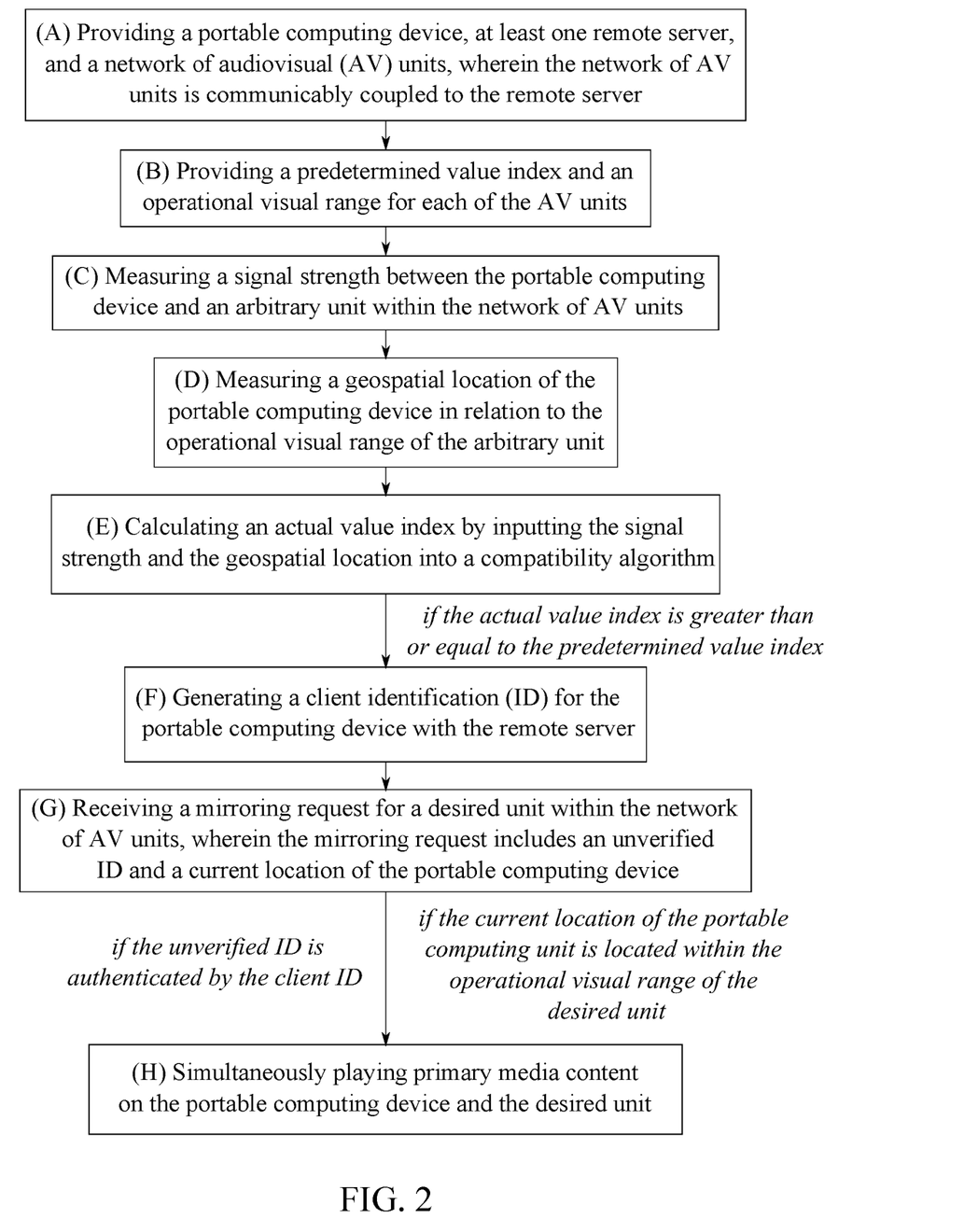
FIG. 2 is a flowchart illustrating the basic overall process of the present invention.

In the process of mirroring media content, the present invention provides a portable computing device 1, at least one remote server 2, and a network of audio visual (AV) units 3. The portable computing device 1 can be, but is not limited to, a mobile phone or a tablet (Step A). As seen in FIG. 1, the network of AV units 3 is communicably coupled to the remote server 2 which is utilized to save data received when executing the method introduced through the present invention. In order to determine the compatibility between the portable computing device 1 and the network of AV units 3, each of the network of AV units 3 is provided with a predetermined value index and an operational visual range (Step B). The predetermined value index can differ in various embodiments of the present invention depending on the properties of the portable computing device 1 and the properties of the network of AV units 3. In the preferred embodiment, the present invention functions via a wireless network which can be, but is not limited to, WiFi. Therefore, as an initial step of determining the compatibility of the mobile phone, the present invention measures a signal strength between the portable computing device 1 and an arbitrary unit within the network of AV units 3 (Step C). Moreover, the present invention also measures a geospatial location of the portable computing device 1 in relation to the operational visual range of the arbitrary unit (Step D). By inputting the signal strength and the geospatial location into a compatibility algorithm, the present invention calculates an actual value index (Step E). The actual value index is used to determine the ability of the portable computing device 1 to connect to the network of AV units 3. In doing so, the present invention generates a client identification (ID) for the portable computing device 1 with the remote server 2, if the actual value index is greater than or equal to the predetermined value index (Step F). In other words, the client ID is created only if the portable computing device 1 is determined to be compatible with the network of AV units 3. When the portable computing device 1 is paired with the network of AV units 3, the present invention receives a mirroring request for a desired unit within the network of AV units 3 (Step G). The mirroring request includes an unverified ID and a current location of the portable computing device 1. A beacon signal or other comparable method can be used to provide the current location. If the unverified ID is authenticated by the client ID generated earlier, and the current location of the portable computing device 1 is located within the operational visual range of the desired unit, the present invention simultaneously plays primary media content on the portable computing device 1 and the desired unit (Step H). Resultantly, a user can view the primary media content on a larger screen compared to a smaller screen of the portable computing device 1. FIG. 2 illustrates the overall process flow of the present invention.

Figure 3:
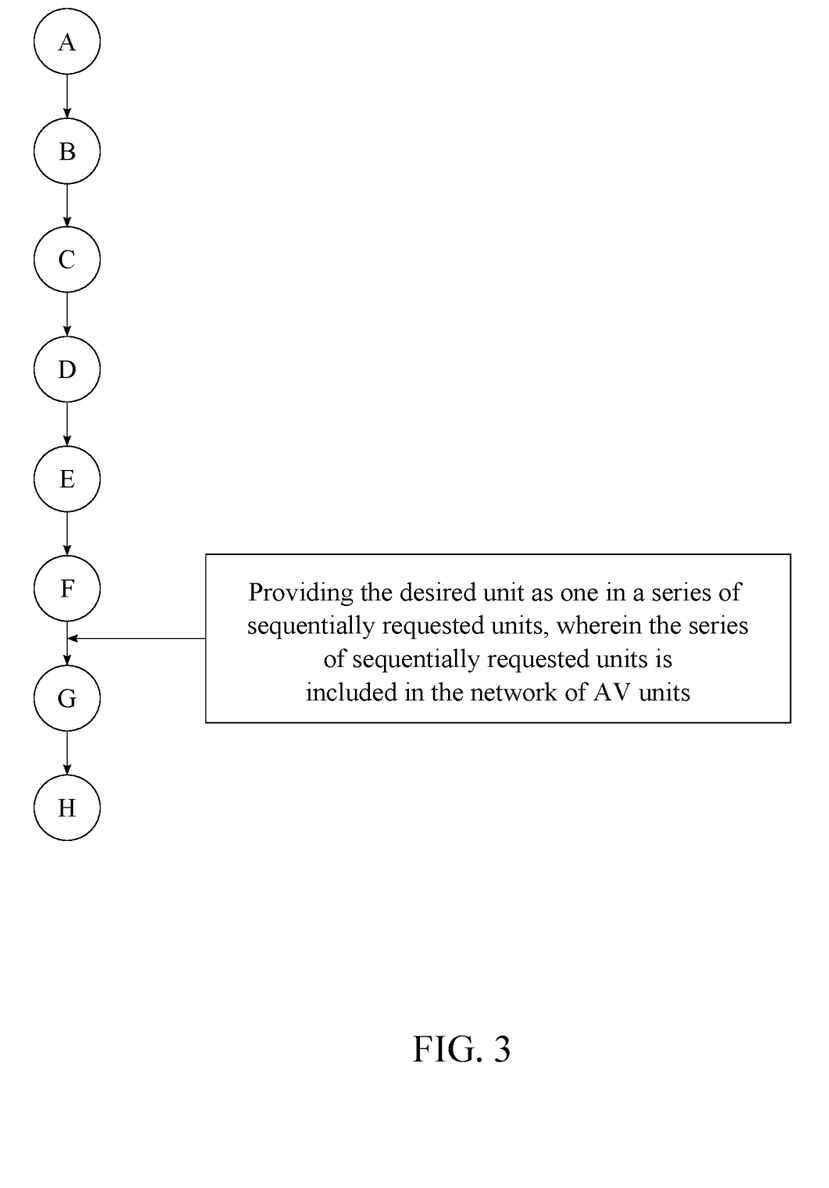
FIG. 3 is a flowchart illustrating the mirroring handing over process of the present invention.

The present invention also allows the user to be mobile during the mirroring process. In order to do so, the present invention hands over the mirroring process to another AV unit which is closest to the user with the portable computing device 1 such that the user is not limited to the vicinity of the desired unit. In the process of handing over the mirroring, the present invention provides the desired unit as one in a series of sequentially requested units, wherein the series of sequentially requested units is included in the network of AV units 3. When handing over the mirroring is initiated, the previously executed steps of receiving the mirroring request (Step G) and simultaneously playing the primary media content (Step H) is repeated for each of the sequentially requested units as shown in FIG. 3. As an example, we will consider the user moving from the desired unit to an adjacent AV unit from the network of AV units 3. When the user with the portable computing device 1 is in the vicinity of the adjacent AV unit, the present invention receives a new mirroring request for the adjacent AV unit. As before, the new minoring request includes the unverified ID and the current location of the portable computing device 1. If the unverified ID is authenticated by the client ID, and the current location of the portable computing device 1 is within the operational visual range of the adjacent AV unit, the present invention plays the primary media content on the portable computing device 1 and the adjacent AV unit.

Figure 4:
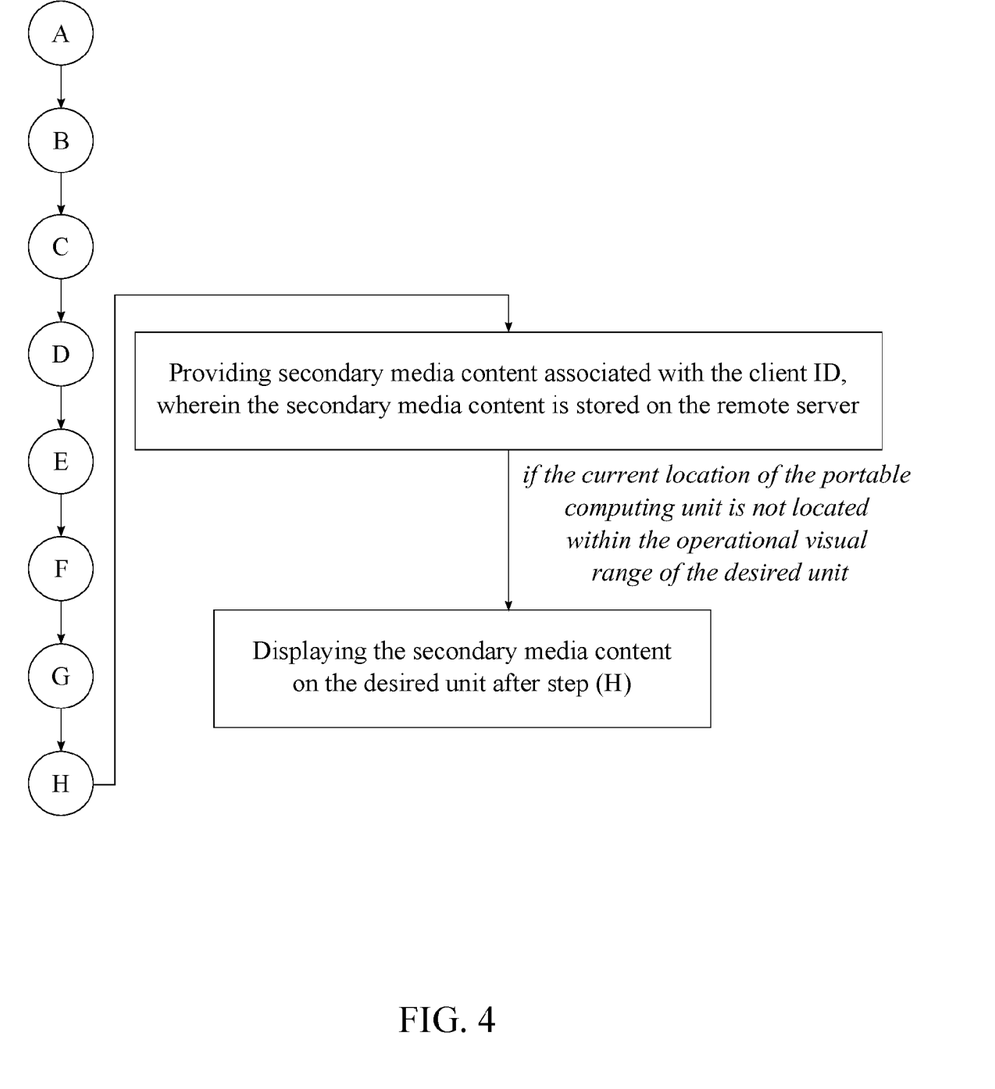
FIG. 4 is a flowchart illustrating the process of displaying the secondary media content.

As mentioned earlier, when the primary media content played on the desired unit is handed over to the adjacent AV unit, the desired unit switches to a stand-by mode. The stand-by mode is utilized to display personalized media. In the preferred embodiment, the present invention is provided with secondary media content to be displayed if the portable computing device 1 is not within the operational visual range of the desired unit, and the desired unit is in the stand-by mode. The secondary media content is associated with the client ID and is stored on the remote server 2. However, in different embodiments of the present invention, the secondary media content can also be saved on the desired unit such that the desired unit can still display the secondary media content even if the remote server 2 is not active. As seen in FIG. 4, the secondary media content, unique to the client ID, is displayed after the desired unit completes playing the primary media content (Step H) with the portable computing device 1.

Figure 5:
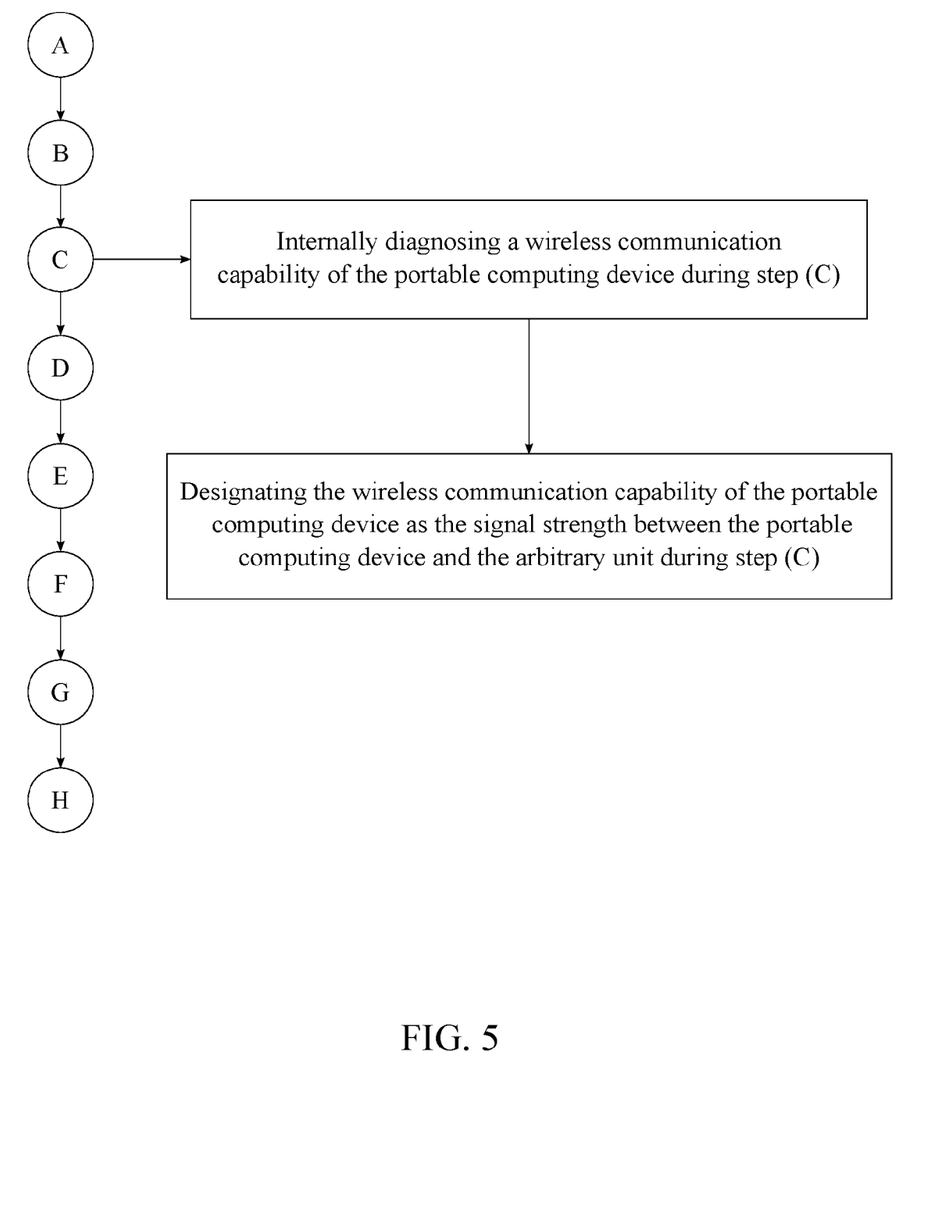
FIG. 5 is a flowchart illustrating the process of measuring the signal strength.

In the process of determining the actual value index, the present invention measures the signal strength as discussed earlier. As an initial step of the process, the present invention internally diagnoses a wireless communication capability of the portable computing device 1 as shown in FIG. 5. The diagnosing is done when the signal strength is measured between the portable computing device 1 and the arbitrary unit (Step C). When the wireless communication capability is determined, the present invention designates the wireless communication capability of the portable computing device 1 as the signal strength between the portable computing device 1 and the arbitrary unit (Step C). In the preferred embodiment of the present invention, the WiFi signal strength between the arbitrary unit and the portable computing device 1 is measured.

Figure 6:
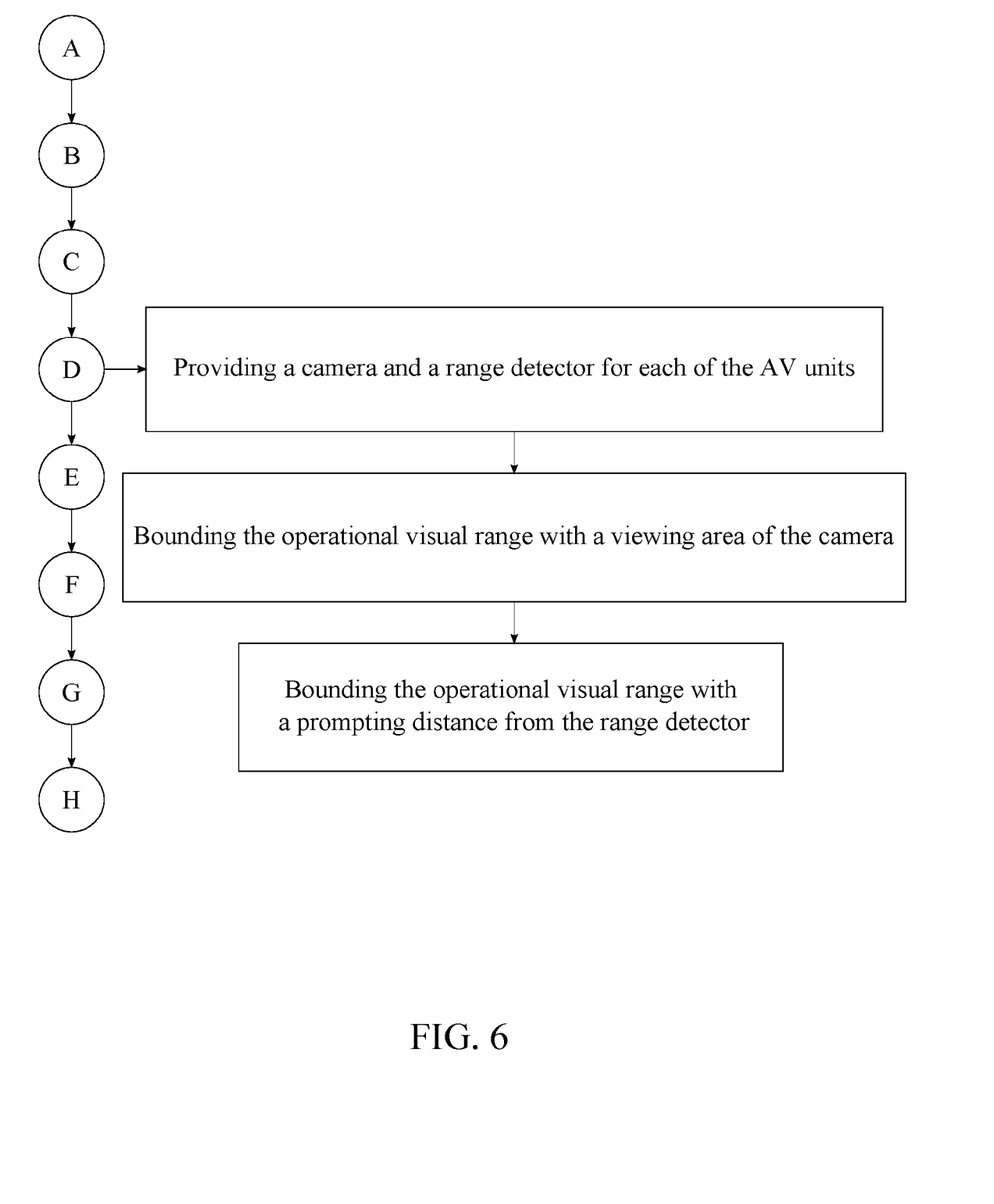
FIG. 6 is a flowchart illustrating the process of measuring the geospatial location of the portable computing device.

As discussed earlier, the geospatial location of the portable computing device 1 is measured in relation to the operational visual range of the arbitrary unit. In order to do so, each of the AV units is provided with a camera and a range detector as seen in FIG. 6. The operational visual range is bounded with a viewing area of the camera. In other words, the camera is used to identify the portable computer device within the viewing area. Moreover, the operational visual range is also bounded with a prompting distance from the range detector. As an example, if the user with the portable computing device 1 is within the viewing area and also within the prompting distance, the portable computing device 1 is said to be within the operational visual range. The range detector is also utilized to determine a closest AV unit of the network of AV units 3 when handing over the mirroring. The range detector can work in correspondence with a beacon signal of the portable computing device 1 when determining the closest AV unit and also when determining the prompting distance.

Figure 7:
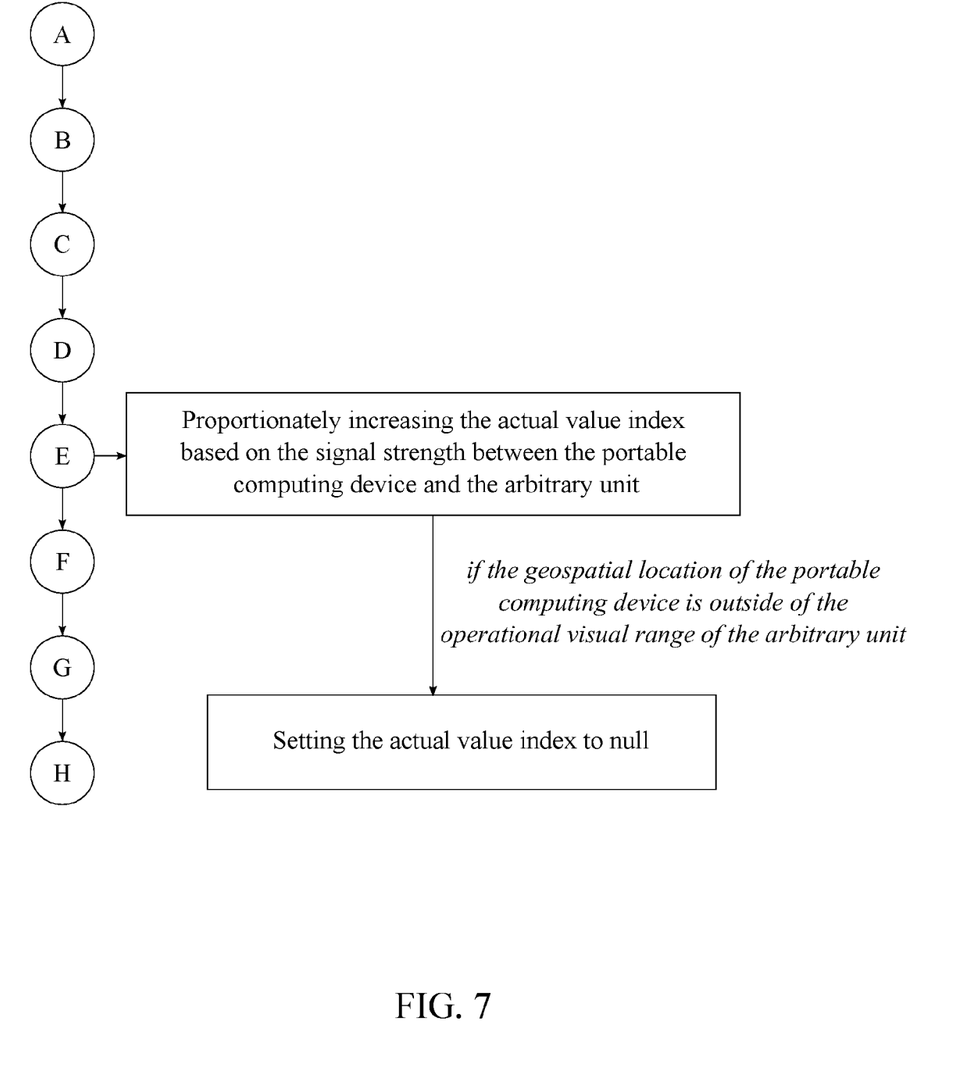
FIG. 7 is a flowchart illustrating the process of calculating the value index.

The actual value index is calculated to be used in the compatibility algorithm discussed earlier. When considering the signal strength in the compatibility algorithm, the present invention proportionately increases the actual value index based on the signal strength between the portable computing device 1 and the arbitrary unit. In other words, the actual value index increases with increasing signal strength. When considering the geospatial location, the present invention sets the actual value index to null if the geospatial location of the portable computing device 1 is outside of the operational visual range of the arbitrary unit. The process of calculating the value index is shown in FIG. 7.

Figure 8:
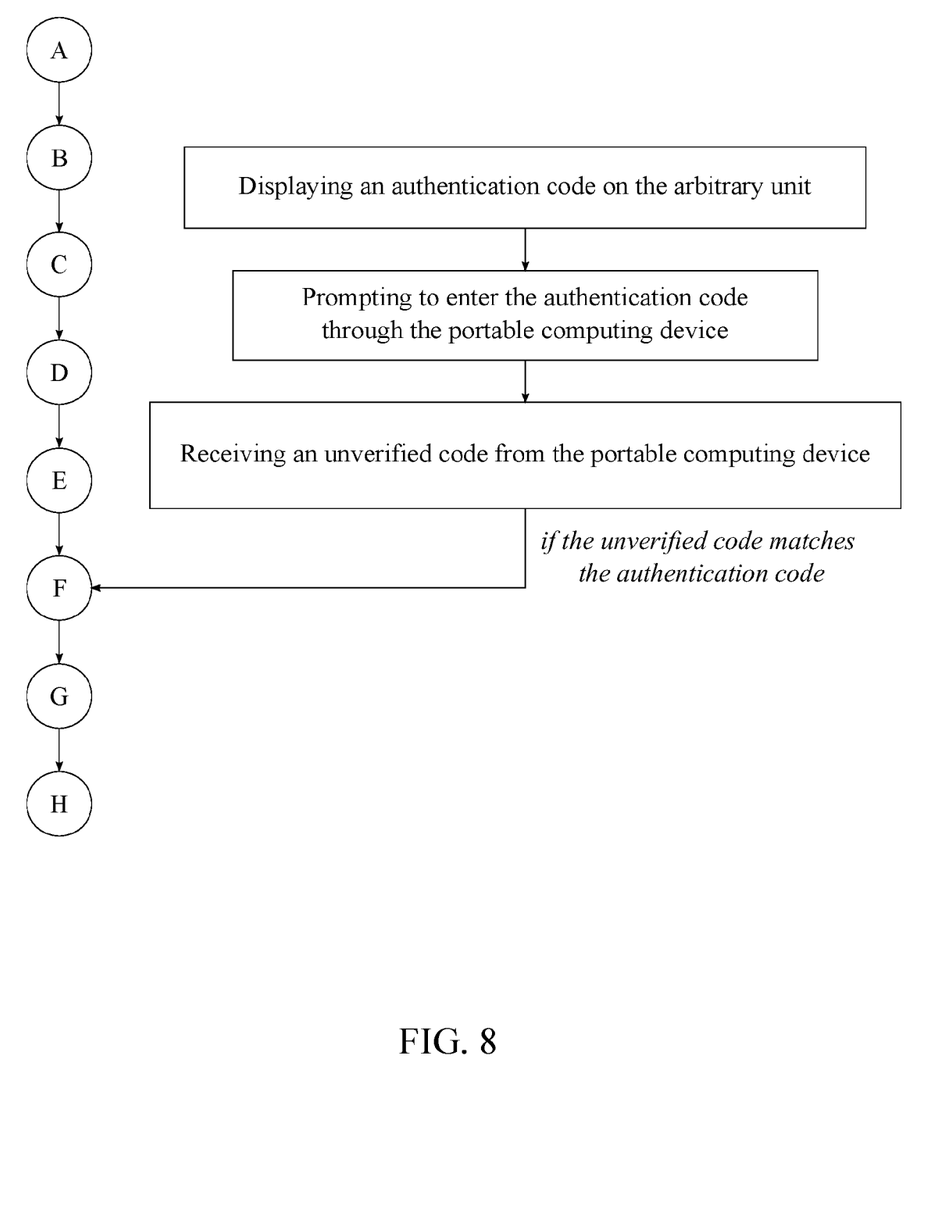
FIG. 8 is a flowchart illustrating the process of using an authentication code when generating the client identification.

In the process of creating the client ID, the present invention utilizes an authentication code as seen in FIG. 8. In doing so, the present invention initially displays the authentication code on the arbitrary unit. Simultaneously, the present invention prompts the user to enter the authentication code through the portable computing device 1. When entered, the present invention receives an unverified code from the portable computing device 1. If the unverified code matches the authentication code previously displayed on the arbitrary unit, the present invention proceeds to generate the client ID for the portable computing device 1 (Step F).

In the preferred embodiment of the present invention, the primary media content contains video content. However, the primary media content can vary in different embodiments of the present invention. In order to accommodate an audio portion of the primary media content, each of the network AV units 3 is provided with at least one speaker. When the mirroring process is executed, the audio portion is played through the at least one speaker. Additionally, each of the AV units can also have at least one microphone in other embodiments of the present invention.

The present invention can also be implemented with an automated hub. The automated hub is utilized in the process of identifying the portable computing device. Moreover, the automated hub can also be used for a group of users such that multiple portable computing devices can be paired with the network of AV units 3 simultaneously. In order to execute these functions, the automated hub is provided with a processor, a plurality of cameras, a transceiver, a plurality of motion sensors, a temperature sensor, at least one integrated speaker, at least one integrated microphone, and at least one motor. The processor and the transceiver allow the automated hub to connect to the remote server 2 and the network of AV units 3.

In the preferred embodiment of the present invention, only one user executes the mirroring with the network of AV units 3. However, the number of users who can utilize the network of AV units 3 can differ in other embodiments of the present invention. When utilizing the present invention, the following process flow is generally followed. Initially, the signal strength between the portable computing device 1 and the arbitrary unit is measured. In reference to the preferred embodiment of the present invention, the WiFi signal strength is measured. In order to do so, the wireless communication capability of the portable computing device 1 is diagnosed. Next, the geospatial location of the portable computing device 1 is measured in relation to the operational visual range. The camera and the range detector are used to determine the geospatial location of the portable computing device 1. Based upon the signal strength and the geospatial location, the present invention then calculates the actual value index. Next, if the actual value index is greater than or equal to the predetermined value index, the present invention generates the client ID. In other words, information regarding the user who is utilizing the portable computing device 1 is stored on the remote server 2. When the user intends to play the primary media content the following process flow occurs. The present invention receives the mirroring request with the unverified ID and the current location of the portable computing device 1. If the unverified ID is authenticated to be the client ID, and the current location of the portable computing device 1 is within the operational visual range of the desired unit, the present invention plays the primary media content. When the user moves to the adjacent AV unit, the present invention receives the new minoring request and the adjacent AV unit plays the primary media content accordingly. Simultaneously, the desired unit which played the primary media content prior to the adjacent AV unit, displays the secondary media content associated with the client ID. The secondary media content can be, but is not limited to, personal photos. Since the primary media content is moving along with the user, the mobility of the user is not hindered and the process of playing the primary media content also remains uninterrupted. The primary media content can be, but is not limited to, video conferencing or gaming.

Although the invention has been explained in relation to its preferred embodiment, it is to be understood that many other possible modifications and variations can be made without departing from the spirit and scope of the invention as hereinafter claimed.

What is claimed is:

1. A method for mirroring media content and handing over the mirroring by executing computer-executable instructions stored on a non-transitory computer-readable medium, the method comprises the steps of:
   (A) providing a portable computing device, at least one remote server, and a network of audiovisual (AV) units, wherein the network of AV units is communicably coupled to the remote server;
   (B) providing a predetermined value index and an operational visual range for each of the AV units;
   (C) measuring a signal strength between the portable computing device and an arbitrary unit within the network of AV units;
   (D) measuring a geospatial location of the portable computing device in relation to the operational visual range of the arbitrary unit;
   (E) calculating an actual value index by inputting the signal strength and the geospatial location into a compatibility algorithm;
   (F) generating a client identification (ID) for the portable computing device with the remote server, if the actual value index is greater than or equal to the predetermined value index;
   (G) receiving a mirroring request for a desired unit within the network of AV units, wherein the minoring request includes an unverified ID and a current location of the portable computing device;
   (H) simultaneously playing primary media content on the portable computing device and the desired unit, if the unverified ID is authenticated by the client ID, and if the current location of the portable computing unit is located within the operational visual range of the desired unit; and
   providing the desired unit as one in a series of sequentially requested units, wherein the series of sequentially requested units is included in the network of AV units; and executing an iteration of steps (G) and (H) for each of the sequentially requested units.

2. The method for mirroring media content and handing over the mirroring by executing computer-executable instructions stored on a non-transitory computer-readable medium, the method as claimed in claim 1 comprises the steps of:
   providing secondary media content associated with the client ID, wherein the secondary media content is stored on the remote server; and
   displaying the secondary media content on the desired unit after step (H),
   if the current location of the portable computing unit is not located within the operational visual range of the desired unit.

3. The method for mirroring media content and handing over the mirroring by executing computer-executable instructions stored on a non-transitory computer-readable medium, the method as claimed in claim 1 comprises the steps of:
   internally diagnosing a wireless communication capability of the portable computing device during step (C); and
   designating the wireless communication capability of the portable computing device as the signal strength between the portable computing device and the arbitrary unit during step (C).

4. The method for mirroring media content and handing over the mirroring by executing computer-executable instructions stored on a non-transitory computer-readable medium, the method as claimed in claim 1 comprises the steps of:
   providing a camera and a range detector for each of the AV units;
   bounding the operational visual range with a viewing area of the camera; and
   bounding the operational visual range with a prompting distance from the range detector.

5. The method for mirroring media content and handing over the mirroring by executing computer-executable instructions stored on a non-transitory computer-readable medium, the method as claimed in claim 1 comprises the steps of:

proportionately increasing the actual value index based on the signal strength between the portable computing device and the arbitrary unit; and setting the actual value index to null,
if the geospatial location of the portable computing device is outside of the operational visual range of the arbitrary unit.

6. The method for mirroring media content and handing over the mirroring by executing computer-executable instructions stored on a non-transitory computer-readable medium, the method as claimed in claim 1 comprises the steps of:

displaying an authentication code on the arbitrary unit;
prompting to enter the authentication code through the portable computing device;
receiving an unverified code from the portable computing device; and
executing step (F),
if the unverified code matches the authentication code.

7. The method for mirroring media content and handing over the mirroring by executing computer-executable instructions stored on a non-transitory computer-readable medium, the method as claimed in claim 1 comprises the steps of:

providing at least one speaker for each of the AV units; and
playing an audio portion of the primary media content through the at least one speaker.

\* \* \* \* \*